(12) United States Patent
Ishida et al.

(10) Patent No.: US 11,154,931 B2
(45) Date of Patent: Oct. 26, 2021

(54) MANUFACTURING METHOD OF THREE-DIMENSIONAL FORMED OBJECT BY FORMING CONTOUR REGION AND OBJECT

(71) Applicant: SEIKO EPSON CORPORATION, Tokyo (JP)

(72) Inventors: Masaya Ishida, Hara-mura (JP); Hajime Onishi, Chino (JP); Eiji Okamoto, Matsumoto (JP); Kentaro Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 508 days.

(21) Appl. No.: 15/291,634

(22) Filed: Oct. 12, 2016

(65) Prior Publication Data
US 2017/0106444 A1 Apr. 20, 2017

(30) Foreign Application Priority Data

Oct. 15, 2015 (JP) .............................. JP2015-203468

(51) Int. Cl.
*B22F 10/20* (2021.01)
*B29C 64/112* (2017.01)
(Continued)

(52) U.S. Cl.
CPC .............. *B22F 10/20* (2021.01); *B23K 9/042* (2013.01); *B23K 9/124* (2013.01); *B23K 9/133* (2013.01);
(Continued)

(58) Field of Classification Search
None
See application file for complete search history.

(56) References Cited

U.S. PATENT DOCUMENTS 5,207,371 A * 5/1993 Prinz ....................... B23P 23/04
228/125
5,529,471 A * 6/1996 Khoshevis .............. B29C 41/36
425/112

(Continued)

FOREIGN PATENT DOCUMENTS

CN 103231056 A 8/2013
JP 2006-045584 A 2/2006
(Continued)

OTHER PUBLICATIONS

Gibson et al. "Additive Manufacturing Technologies" Springer. 2010. (Year: 2010).*

*Primary Examiner* — Paul A Wartalowicz
*Assistant Examiner* — Stephani Hill
(74) *Attorney, Agent, or Firm* — Workman Nydegger

(57) ABSTRACT

A manufacturing method for a three-dimensional formed object for manufacturing the three-dimensional formed object by stacking layers includes supplying a first forming material of the three-dimensional formed object to a contour region of the three-dimensional formed object in the layers, applying energy to the first forming material supplied to the contour region to solidify the first forming material, supplying a second forming material to a region corresponding to the three-dimensional formed object, the region being a contact region in contact with the contour region, and applying energy to the second forming material supplied to the contact region to solidify the second forming material.

6 Claims, 9 Drawing Sheets

(51) Int. Cl.
*B33Y 10/00* (2015.01)
*B22F 10/30* (2021.01)
*B28B 1/00* (2006.01)
*B33Y 30/00* (2015.01)
*B23K 26/144* (2014.01)
*B23K 26/342* (2014.01)
*B23K 9/04* (2006.01)
*B23K 9/12* (2006.01)
*B23K 9/133* (2006.01)

(52) U.S. Cl.
CPC .......... *B23K 26/144* (2015.10); *B23K 26/342* (2015.10); *B29C 64/112* (2017.08); *B33Y 10/00* (2014.12); *B33Y 30/00* (2014.12); *B22F 10/30* (2021.01); *B22F 2999/00* (2013.01); *B28B 1/001* (2013.01); *Y02P 10/25* (2015.11)

(56) References Cited

U.S. PATENT DOCUMENTS

| | | | |
|---|---|---|---|
| 5,738,817 A * | 4/1998 | Danforth | B29C 41/36 264/603 |
| 6,372,178 B1 * | 4/2002 | Tseng | B29C 41/12 264/656 |
| 7,625,512 B2 | 12/2009 | Cruz-Uribe et al. | |
| 2003/0003179 A1 * | 1/2003 | Farnworth | B23K 26/0734 425/174.4 |
| 2005/0015171 A1 * | 1/2005 | Cruz-Uribe | B41J 25/308 700/118 |
| 2006/0165546 A1 | 7/2006 | Yamada et al. | |
| 2011/0285052 A1 * | 11/2011 | Wigand | B33Y 30/00 264/219 |
| 2014/0348692 A1 * | 11/2014 | Bessac | B22F 3/1055 419/53 |
| 2016/0221261 A1 | 8/2016 | Yamamoto et al. | |
| 2017/0066197 A1 * | 3/2017 | Morikawa | C08F 222/1006 |
| 2017/0106589 A1 | 4/2017 | Ishisa et al. | |
| 2018/0221952 A1 | 8/2018 | Yoshida et al. | |

FOREIGN PATENT DOCUMENTS

| | | | | |
|---|---|---|---|---|
| JP | 2006-200030 A | 8/2006 | | |
| JP | 2007-531641 A | 11/2007 | | |
| JP | 2015-124395 | 7/2015 | | |
| JP | 2017-030225 | 2/2017 | | |
| JP | 2017-075361 A | 4/2017 | | |
| WO | WO-2006133034 A1 * | 12/2006 | | B23K 9/04 |
| WO | 2015-049834 | 4/2015 | | |

* cited by examiner

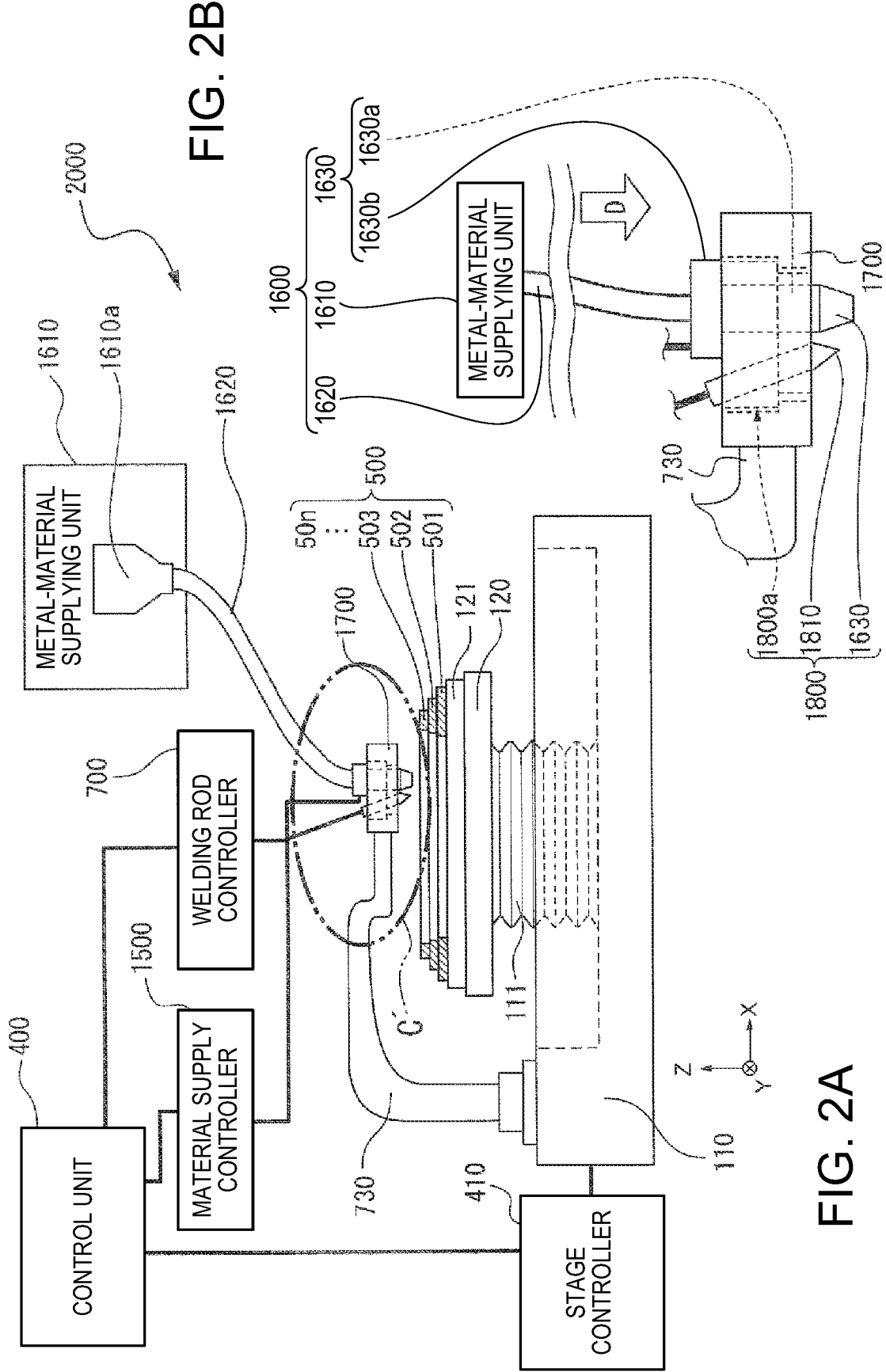

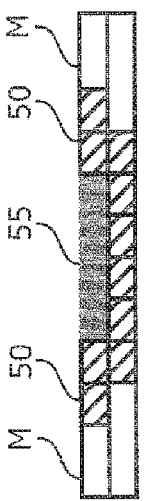
FIG. 7A
FIG. 7B
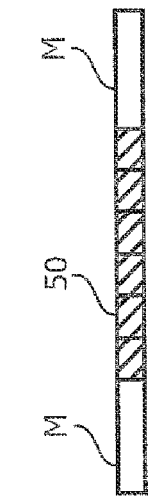
FIG. 7C
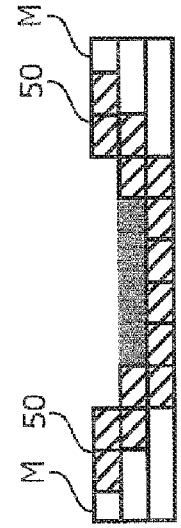
FIG. 7D
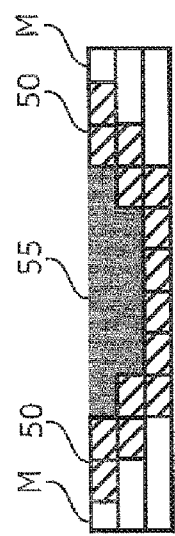
FIG. 7E
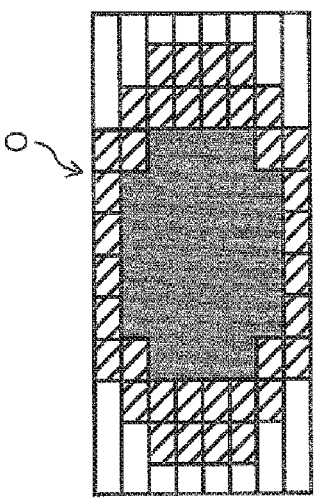
FIG. 7F
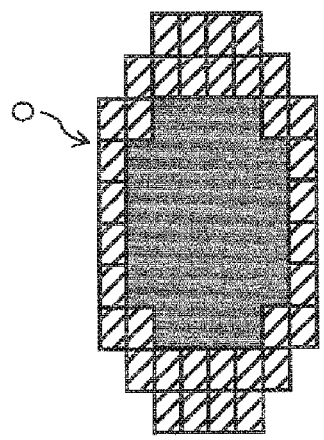
FIG. 7G
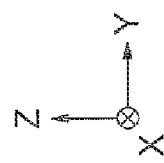

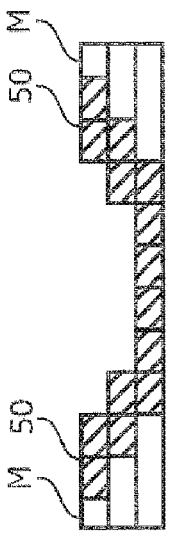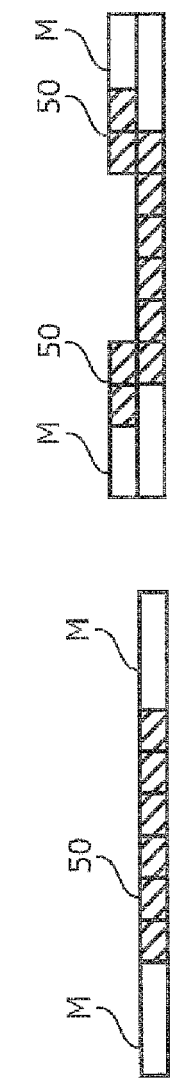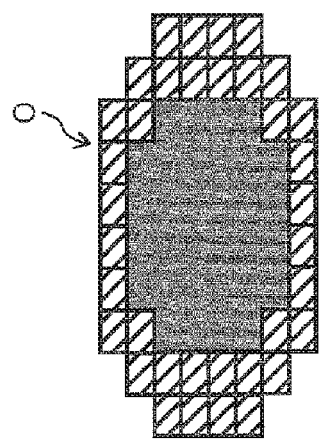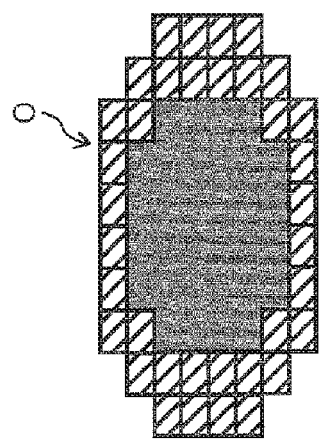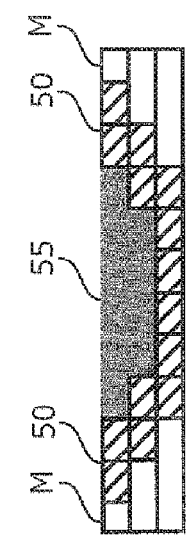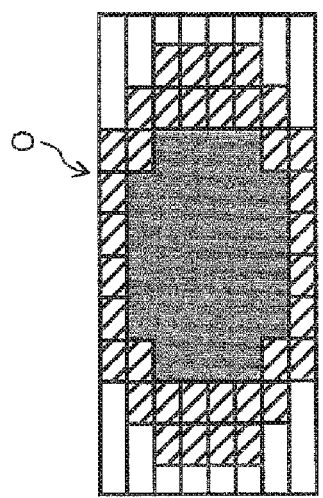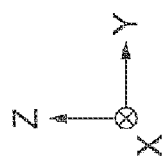

MANUFACTURING METHOD OF THREE-DIMENSIONAL FORMED OBJECT BY FORMING CONTOUR REGION AND OBJECT

BACKGROUND

1. Technical Field

The present invention relates to a manufacturing method for a three-dimensional formed object and a manufacturing apparatus for a three-dimensional formed object.

2. Related Art

A manufacturing method for manufacturing a three-dimensional formed object by stacking layers has been carried out. As such manufacturing method for the three-dimensional formed object, for example, JP-A-2006-200030 (Patent Literature 1) discloses a manufacturing method for, while supplying a powder material, applying thermal energy to the powder material to form layers and stacking the layers to thereby manufacture a three-dimensional formed object.

However, in the manufacturing method in the past for manufacturing the three-dimensional formed object by stacking the layers, it is difficult to achieve both of manufacturing accuracy and manufacturing speed of the three-dimensional formed object. For example, the manufacturing speed of the three-dimensional formed object is increased by increasing supply speed of a material (increasing a supply unit) or widening an application range of the thermal energy. However, the manufacturing accuracy decreases. On the other hand, the manufacturing accuracy of the three-dimensional formed object is increased by reducing the supply speed of the material (reducing the supply unit) or narrowing the application range of the thermal energy. However, the manufacturing speed decreases.

SUMMARY

An advantage of some aspects of the invention is to achieve both of manufacturing accuracy and manufacturing speed of a three-dimensional formed object.

A first aspect of the invention is directed to a manufacturing method for a three-dimensional formed object for manufacturing the three-dimensional formed object by stacking layers, the manufacturing method for the three-dimensional formed object including: supplying a first forming material of the three-dimensional formed object to a contour region of the three-dimensional formed object in the layers; applying energy to the first forming material supplied to the contour region to solidify the first forming material; supplying a second forming material to a region corresponding to the three-dimensional formed object, the region being a contact region in contact with the contour region; and applying energy to the second forming material supplied to the contact region to solidify the second forming material.

According to this aspect, it is possible to execute at least one of a condition that a supply unit of the second forming material in the supplying the second forming material is larger than a supply unit of the first forming material in the supplying the first forming material and a condition that an application range of the energy in the solidifying the second forming material is wider than an application range of the energy in the solidifying the first forming material. Consequently, it is possible to highly accurately form the contour region where manufacturing accuracy of the three-dimensional formed object needs to be increased. It is possible to form, at high speed, the contact region where the manufacturing accuracy of the three-dimensional formed object does not need to be increased. Therefore, it is possible to achieve both of the manufacturing accuracy and the manufacturing speed of the three-dimensional formed object.

The "first forming material" and the "second forming material" may be different or may be the same. When the "first forming material" and the "second forming material" are the same, a configuration in which the "supplying the first forming material" includes the "supplying the second forming material" (the "supplying the second forming material" is not performed separately from the "supplying the first forming material" because the "supplying the first forming material" includes the "supplying the second forming material") is also included in the invention.

Note that the "contour" is a portion that forms a shape of the surface of the three-dimensional formed object. For example, when a coat layer is provided on the surface of the three-dimensional formed object, the "contour" sometimes means a lower layer of the coat layer.

The "supply unit" means, for example, when the forming materials are intermittently supplied, the size of the individual forming material (when the forming materials are supplied in a state of droplets, the size of the droplets) and, when the forming materials are continuously supplied, supply width of the forming material. The "application range of the energy" means, for example, when the energy is radiated and applied, a radiation range of the energy.

Concerning the "solidify", a form of sintering particles and a form of solidifying the particles after melting the particles are also explained as solidifying the particles.

The "second forming material capable of achieving a purpose other than increasing the manufacturing accuracy" is not particularly limited. However, examples of the second forming material include a metal material (including an alloy and metal oxide). When the metal material is used as the second forming material, it is possible to increase the strength of the three-dimensional formed object. It is possible to configure a three-dimensional formed object having high strength.

A second aspect of the invention is directed to a manufacturing method for a three-dimensional formed object for manufacturing the three-dimensional formed object by stacking layers, the manufacturing method for the three-dimensional formed object including: supplying a first forming material of the three-dimensional formed object to a contour region of the three-dimensional formed object in the layers; applying energy to the first forming material supplied to the contour region to solidify the first forming material; and supplying, while applying energy to a contact region in contact with the contour region, a second forming material to a region corresponding to the three-dimensional formed object to solidify the second forming material supplied to the contact region.

According to this aspect, it is possible to execute at least one of a condition that a supply unit of the second forming material in the supplying the second forming material is larger than a supply unit of the first forming material in the supplying the first forming material and a condition that an application range of the energy in the solidifying the second forming material is wider than an application range of the energy in the solidifying the first forming material. Consequently, it is possible to highly accurately form the contour region where manufacturing accuracy of the three-dimensional formed object needs to be increased. It is possible to form, at high speed, the contact region where the manufacturing accuracy of the three-dimensional formed object does not need to be increased. Therefore, it is possible to achieve both of the manufacturing accuracy and the manufacturing speed of the three-dimensional formed object.

A third aspect of the invention is directed to the manufacturing method for the three-dimensional formed object according to the first or second aspect, in which the supplying the first forming material includes supplying the first forming material to the contour region with a noncontact jet dispenser.

According to this aspect, the first forming material is supplied to the contour region by the noncontact jet dispenser. The noncontact jet dispenser is capable of discharging and disposing the first forming material at a short cycle. Therefore, it is possible to increase the manufacturing speed of the three-dimensional formed object.

A fourth aspect of the invention is directed to the manufacturing method for the three-dimensional formed object according to the first or second aspect, in which the supplying the first forming material includes supplying the first forming material to the contour region with a needle dispenser.

According to this aspect, the first forming material is supplied to the contour region by the needle dispenser. The needle dispenser is capable of finely adjusting an amount of the first forming material and accurately disposing the first forming material in a desired position. Therefore, it is possible to increase the manufacturing accuracy of the three-dimensional formed object.

A fifth aspect of the invention is directed to the manufacturing method for the three-dimensional formed object according to any one of the first to fourth aspects, in which the supply of the second forming material is performed after the supplying the first forming material.

It is possible to increase the manufacturing accuracy of the three-dimensional formed object by performing the supply of the second forming material after the supplying the first forming material. Therefore, according to this aspect, since the supply of the second forming material is performed after the supplying the first forming material, it is possible to increase the manufacturing accuracy of the three-dimensional formed object.

A sixth aspect of the invention is directed to the manufacturing method for the three-dimensional formed object according to the fifth aspect, in which the supply of the second forming material is performed after the contour region is formed for a plurality of layers in the layers in the supplying the first forming material.

According to this aspect, the supply of the second forming material is performed after the contour region is formed for a plurality of layers in the supplying the first forming material. By performing the supply of the second forming material, for which accuracy does not need to be increased in particular, collectively for the plurality of layers in this way, it is possible to increase the manufacturing speed of the three-dimensional formed object.

A seventh aspect of the invention is directed to the manufacturing method for the three-dimensional formed object according to any one of the first to sixth aspects, in which the solidifying the first forming material includes applying an electromagnetic wave to the first forming material to solidify the first forming material.

According to this aspect, in the solidifying the first forming material, the electromagnetic wave is applied to the first forming material to solidify the first forming material. Consequently, it is possible to easily and highly accurately perform the solidifying the first forming material.

An eighth aspect of the invention is directed to the manufacturing method for the three-dimensional formed object according to any one of the first to seventh aspects, in which the solidifying the second forming material includes supplying the second forming material to the contact region, on which a laser is radiated, to solidify the second forming material.

According to this aspect, in the solidifying the second forming material, the second forming material is supplied to the contact region, on which the laser is radiated, to solidify second forming material. Therefore, it is possible to easily and highly accurately perform the solidifying the second forming material.

A ninth aspect of the invention is directed to the manufacturing method for the three-dimensional formed object according to any one of the first to seventh aspects, in which the solidifying the second forming material includes applying heat generated by arc discharge to the second forming material to solidify the second forming material.

According to this aspect, in the solidifying the second forming material, the heat generated by the arc discharge is applied to the second forming material to solidify the second forming material. Consequently, it is possible to apply thermal energy to a wide range. It is possible to increase the manufacturing speed of the three-dimensional formed object. Therefore, it is possible to quickly perform the solidifying the second forming material.

A tenth aspect of the invention is directed to the manufacturing method for the three-dimensional formed object according to any one of the first to ninth aspects, in which the first forming material includes at least one of magnesium, iron, copper, cobalt, titanium, chrome, nickel, aluminum, maraging steel, stainless steel, cobalt chrome molybdenum, a titanium alloy, a nickel alloy, an aluminum alloy, a cobalt alloy, a cobalt chrome alloy, alumina, and silica.

According to this aspect, it is possible to manufacture a three-dimensional formed object having particularly high rigidity.

An eleventh aspect of the invention is directed to the manufacturing method for the three-dimensional formed object according to any one of the first to tenth aspects, in which, in the supply of the second forming material, the second forming material is supplied in at least one form of a paste state, a powder state, a wire state, and a granular state.

According to this aspect, it is possible to easily supply the second forming material in the paste state or the powder state or quickly supply the second forming material in the wire state or the granular state.

A twelfth aspect of the invention is directed to a manufacturing apparatus for a three-dimensional formed object that manufactures the three-dimensional formed object by stacking layers, the manufacturing apparatus for the three-dimensional formed object including: a first-forming-material supplying section configured to supply a first forming material of the three-dimensional formed object to a contour region of the three-dimensional formed object in the layers; a first-forming-material solidifying section configured to apply energy to the first forming material supplied to the contour region to solidify the first forming material; a second-forming-material supplying section configured to supply a second forming material to a region corresponding to the three-dimensional formed object, the region being a contact region in contact with the contour region; and a second-forming-material solidifying section configured to apply energy to the second forming material supplied to the contact region to solidify the second forming material.

According to this aspect, it is possible to execute at least one of a condition that a supply unit of the second forming material in the second-forming-material solidifying section is larger than a supply unit of the first forming material in the first-forming-material supplying section and a condition that an application range of the energy in the second-forming-material solidifying section is wider than an application range of the energy in the first-forming-material solidifying section. Consequently, it is possible to highly accurately form the contour region where manufacturing accuracy of the three-dimensional formed object needs to be increased. It is possible to form, at high speed, the contact region where the manufacturing accuracy of the three-dimensional formed object does not need to be increased. Therefore, it is possible to achieve both of the manufacturing accuracy and the manufacturing speed of the three-dimensional formed object.

A thirteenth aspect of the invention is directed to a manufacturing apparatus for a three-dimensional formed object that manufactures the three-dimensional formed object by stacking layers, the manufacturing apparatus for the three-dimensional formed object including: a first-forming-material supplying section configured to supply a first forming material of the three-dimensional formed object to a contour region of the three-dimensional formed object in the layers; a first-forming-material solidifying section configured to apply energy to the first forming material supplied to the contour region to solidify the first forming material; and a second-forming-material solidifying section configured to supply, while applying energy to a contact region in contact with the contour region, a second forming material to a region corresponding to the three-dimensional formed object to solidify the second forming material supplied to the contact region.

According to this aspect, it is possible to execute at least one of a condition that a supply unit of the second forming material in the second-forming-material solidifying section is larger than a supply unit of the first forming material in the first-forming-material supplying section and a condition that an application range of the energy in the second-forming-material solidifying section is wider than an application range of the energy in the first-forming-material solidifying section. Consequently, it is possible to highly accurately form the contour region where manufacturing accuracy of the three-dimensional formed object needs to be increased. It is possible to form, at high speed, the contact region where the manufacturing accuracy of the three-dimensional formed object does not need to be increased. Therefore, it is possible to achieve both of the manufacturing accuracy and the manufacturing speed of the three-dimensional formed object.

BRIEF DESCRIPTION OF THE DRAWINGS

The invention will be described with reference to the accompanying drawings, wherein like numbers reference like elements.

FIG. 2A is a schematic configuration diagram showing the configuration of the manufacturing apparatus for the three-dimensional formed object according to the embodiment of the invention.

FIG. 2B is an enlarged view of a C' part shown in FIG. 2A.

FIGS. 7A to 7G are schematic diagrams showing a manufacturing process for a three-dimensional formed object according to the embodiment of the invention.

FIGS. 8A to 8F are schematic diagrams showing a manufacturing process for a three-dimensional formed object according to the embodiment of the invention.

DESCRIPTION OF EXEMPLARY EMBODIMENTS

An embodiment of the invention is explained below with reference to the drawings.

FIGS. 1A to 2B are schematic configuration diagrams showing the configurations of a manufacturing apparatus for a three-dimensional formed object according to an embodiment of the invention.

The manufacturing apparatus for the three-dimensional formed object in this embodiment includes two kinds of material supplying sections and two kinds of energy applying sections. However, FIGS. 1A to 2B are diagrams each showing only one material supplying section and one energy applying section. The other material supplying section and the other energy applying section are omitted.

The manufacturing apparatus for the three-dimensional formed object according to this embodiment is capable of forming a contour region of the three-dimensional formed object and a contact region in contact with the contour region using different materials (also capable of forming the regions using the same material). However, the manufacturing apparatus for the three-dimensional formed object according to this embodiment is not limited to such a manufacturing apparatus for the three-dimensional formed object and may be a manufacturing apparatus for the three-dimensional formed object that forms a contour region of the three-dimensional formed object and a contact region in contact with the contour region using the same material. The manufacturing apparatus for the three-dimensional formed object according to this embodiment may be a manufacturing apparatus for the three-dimensional formed object that forms a contour region and a contact region using a green sheet. The manufacturing apparatus for the three-dimensional formed object according to this embodiment forms the contour region of the three-dimensional formed object using a first forming material (hereinafter simply referred to as forming material as well) and forms the contact region using a second forming material (hereinafter referred to as metal material as well). However, the first forming material and the second forming material are not particularly limited. Besides the metal material, a resin material and the like are also usable.

Note that "three-dimensional forming" in this specification indicates formation of a so-called solid formed object. The "three-dimensional forming" also includes formation of a shape having thickness even if the shape is, for example, a flat shape, a so-called two-dimensional shape.

Figures 1A, 1B:
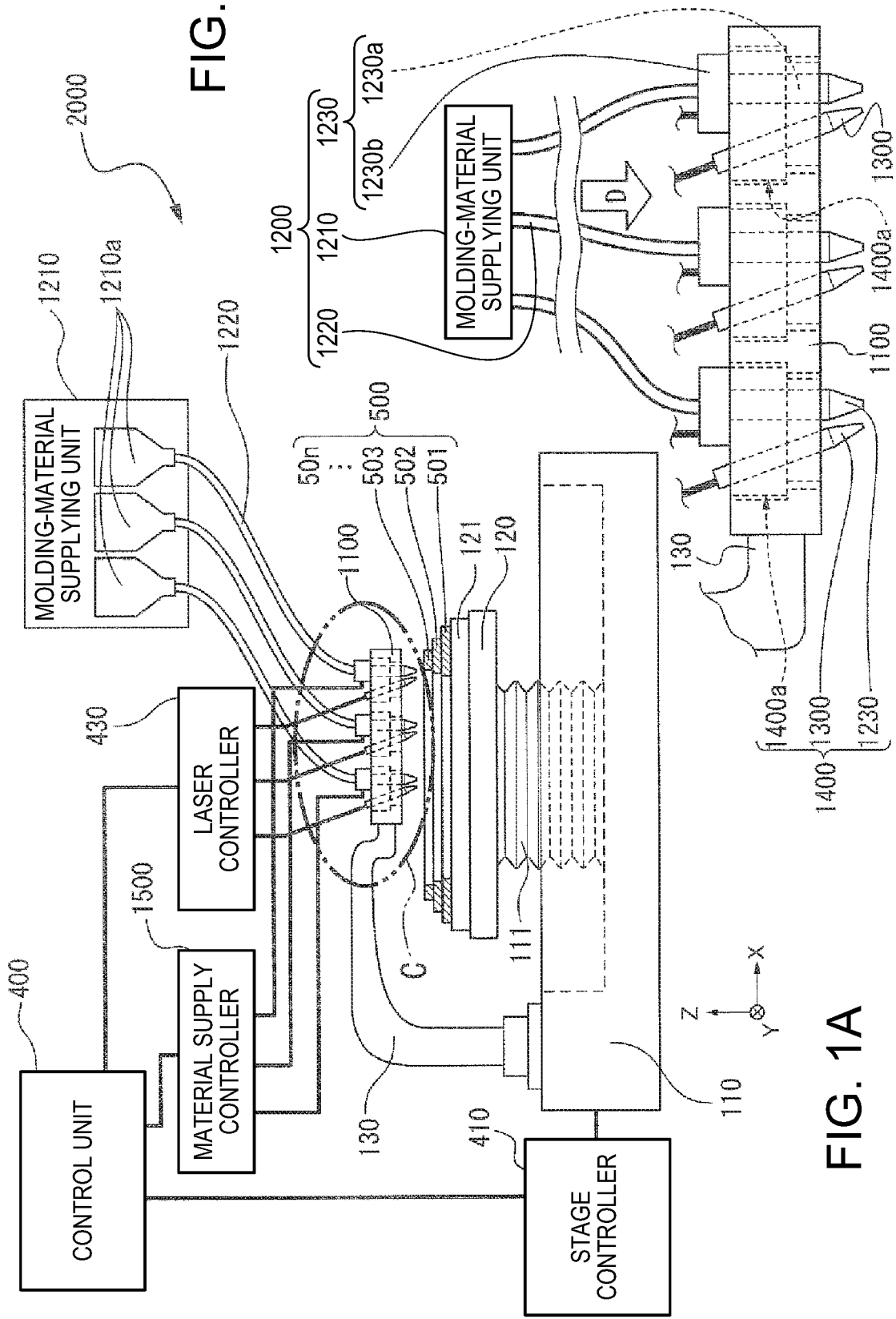
FIG. 1A is a schematic configuration diagram showing the structure of a manufacturing apparatus for a three-dimensional formed object according to an embodiment of the invention.
FIG. 1B is an enlarged view of a C part shown in FIG. 1A.

As shown in FIGS. 1A to 2B, a forming apparatus 2000 includes a base 110 and a stage 120 provided to be capable of being driven to move in X, Y, and Z directions shown in the figures or rotate in a rotating direction centering on a Z axis by a driving device 111 functioning as driving means included in the base 110. As shown in FIGS. 1A and 1B, the forming apparatus 2000 includes a head-base supporting section 130, one end portion of which is fixed to the base 110 and at the other end portion of which a head base 1100, which holds a plurality of head units 1400 including energy radiating sections 1300 and forming-material discharging sections 1230 (a first-forming-material supplying section), is held and fixed. As shown in FIGS. 2A and 2B, the forming apparatus 2000 includes a welding-rod supporting section 730, one end portion of which is fixed to the base 110 and at the other end portion of which a welding rod base 1700, which holds a welding rod unit 1800 including a metal-material discharging section 1630 (a second-forming-material supplying section) and a welding rod 1810 including an arc discharge section, is held and fixed. The welding rod base 1700 is provided in parallel to the head base 1100 on an XY plane.

Note that the metal-material discharging section 1630 in this embodiment has a configuration same as the configuration of the forming-material discharging section 1230 except that a discharge amount (a supply unit) of the metal-material discharging section 1630 is larger than a discharge amount of the forming-material discharging section 1230. However, the forming apparatus 2000 is not limited to such a configuration.

On the stage 120, partial formed objects 501, 502, and 503 in a process of formation into a three-dimensional formed object 500 are formed in a layer shape. For the formation of the three-dimensional formed object 500, application of thermal energy involved in radiation of the thermal energy by a laser and arc discharge is performed. Therefore, for protection from heat of the stage 120, the three-dimensional formed object 500 may be formed on a sample plate 121 having heat resistance. Note that, in FIGS. 1A and 2A, for convenience of explanation, three layers of the partial formed objects 501, 502, and 503 are illustrated. However, layers are stacked up to a desired shape of the three-dimensional formed object 500 (a layer 50*n* shown in FIGS. 1A and 2A).

FIG. 1B is a C-part enlarged conceptual diagram showing the head base 1100 shown in FIG. 1A. As shown in FIG. 1B, the plurality of head units 1400 are held in the head base 1100. As explained in detail below, one head unit 1400 is configured by holding, with a holding jig 1400*a*, the forming-material discharging section 1230 included in a forming-material supplying device 1200 functioning as forming-material supplying means for forming a contour region of the three-dimensional formed object and an energy radiating section 1300 functioning as an energy applying section. The forming-material discharging section 1230 includes a discharge nozzle 1230*a* and a discharge driving section 1230*b* caused by a material supply controller 1500 to discharge the forming material from the discharge nozzle 1230*a*.

FIG. 2B is a C'-part enlarged conceptual diagram showing the welding rod base 1700 shown in FIG. 2A. As shown in FIG. 2B, one welding rod unit 1800 held in the welding rod base 1700. The welding rod unit 1800 is configured by holding, with a holding jig 1800*a*, the metal-material discharging section 1630 included in a metal-material supplying device 1600 functioning as metal-material supplying means and the welding rod 1810 functioning as an energy applying section. The metal-material discharging section 1630 includes a discharge nozzle 1630*a* and a discharge driving section 1630*b* caused by the material supply controller 1500 to discharge the metal material from the discharge nozzle 1630*a*.

The energy radiating section 1300 is explained as an energy radiating section that radiates a laser, which is an electromagnetic wave, as energy (in the following explanation, the energy radiating section 1300 is referred to as laser radiating section 1300). By using the laser as the energy to be radiated, it is possible to radiate the energy targeting a supply material set as a target. It is possible to form a high-quality three-dimensional formed object. It is possible to easily control a radiated energy amount (power and scanning speed) according to, for example, a type of a material to be discharged. It is possible to obtain a three-dimensional formed object having desired quality. For example, it goes without saying that it is also possible to select to sinter and solidify or melt and solidify the material to be discharged. That is, depending on a case, the material to be discharged is a sintered material, a melted material, or a solidified material solidified by another method.

In this embodiment, the welding rod 1810 is an energy applying section that applies, as energy, heat generated by arc discharge. By applying the heat generated by the arc discharge, it is possible to apply thermal energy to a relatively wide range (compared with a laser). It is possible to increase manufacturing speed of the three-dimensional formed object. It is possible to control, for example, according to a type of a material, an amount of the heat generated by the arc discharge and a position where the arc discharge is performed. It is possible to melt a material in a desired range.

The forming-material discharging sections 1230 are connected to, by supply tubes 1220, a forming-material supplying unit 1210 that stores supply materials associated with the respective head units 1400 held in the head base 1100. Predetermined forming materials are supplied from the forming-material supplying unit 1210 to the forming-material discharging sections 1230. In the forming-material supplying unit 1210, molten materials (forming materials) including raw materials of the three-dimensional formed object 500 formed by the forming apparatus 2000 according to this embodiment are stored in forming-material storing sections 1210*a* as supply materials. The respective forming-material storing sections 1210*a* are connected to the respective forming-material discharging sections 1230 by the supply tubes 1220. Since the forming-material supplying unit 1210 includes the respective forming-material storing sections 1210*a* in this way, it is possible to supply a plurality of different kinds of molten materials from the head base 1100.

The metal-material discharging section 1630 is connected to, by a supply tube 1620, a metal-material supplying unit 1610 that stores a supply material associated with the welding rod unit 1800 held in the welding rod base 1700. A predetermined metal material is supplied from the metal-material supplying unit 1610 to the metal-material discharging section 1630. In the metal-material supplying unit 1610, a material (a metal material) including a raw material of the three-dimensional formed object 500 formed by the forming apparatus 2000 according to this embodiment is stored in a metal-material storing section 1610*a* as a supply material. The metal-material storing section 1610*a* is connected to the metal-material discharging section 1630 by the supply tube 1620.

As the forming material and the metal material supplied as the molten material or the sintered material, it is possible to use powder of metal serving as the raw material of the three-dimensional formed object 500, for example, magnesium (Mg), iron (Fe), cobalt (Co), chrome (Cr), aluminum (Al), titanium (Ti), nickel (Ni), or copper (Cu) or a slurry-like (or paste-like) mixed material including powder of an alloy containing one or more of these kinds of metal (maraging steel, stainless steel, cobalt chrome molybdenum, a titanium alloy, a nickel alloy, an aluminum alloy, a cobalt alloy, or a cobalt chrome alloy), alumina, silica, or the like, a solvent, and a binder.

It is possible to use general-purpose engineering plastic such as polyamide, polyacetal, polycarbonate, modified polyphenylene ether, polybutylene terephthalate, or polyethylene terephthalate. Besides, it is possible to use engineering plastic such as polysulphone, polyether sulphone, polyphenylene sulfide, polyallylate, polyimide, polyamide imide, polyether imide, or polyether etherketone.

Expressed in another way, the forming material and the metal material in this embodiment are flowable compositions including metal particles. However, particles are not particularly limited. It is possible to use particles of the general-purpose engineering plastic and the engineering plastic other than metal particles and alloy particles.

The forming apparatus 2000 includes a control unit 400 functioning as control means for controlling, on the basis of data for forming of a three-dimensional formed object output from a not-shown data output apparatus such as a personal computer, the stage 120, the forming-material discharging sections 1230 and the laser radiating sections 1300 included in the forming-material supplying device 1200 and the metal-material discharging section 1630 and the welding rod 1810 included in the metal-material supplying device 1600. The control unit 400 includes, although not shown in the figures, a control section that controls the stage 120, the forming-material discharging sections 1230, and the laser radiating sections 1300 to be driven and operate in association with one another and controls the stage 120, the metal-material discharging section 1630, and the welding rod 1810 to be driven and operate in association with one another. A control signal for the laser radiating section 1300 is sent from the control unit 400 to a laser controller 430. An output signal for radiating a laser is sent from the laser controller 430 to any ones or all of the plurality of laser radiating sections 1300. A control signal for the welding rod 1810 is sent from the control unit 400 to a welding rod controller 700. An output signal for generating arc is sent from the welding rod controller 700 to the welding rod 1810.

For the stage 120 movably provided on the base 110, signals for controlling a movement start, a stop, a moving direction, a moving amount, moving speed, and the like of the stage 120 are generated in a stage controller 410 on the basis of a control signal from the control unit 400. The signals are sent to the driving device 111 included in the base 110. The stage 120 moves in the X, Y, and Z directions shown in the figures. For the forming-material discharging sections 1230 included in the head units 1400, signals for controlling material discharge amounts and the like from the discharge nozzles 1230a in the discharge driving sections 1230b included in the forming-material discharging sections 1230 are generated in the material supply controller 1500 on the basis of a control signal from the control unit 400. Predetermined amounts of forming materials are discharged from the discharge nozzles 1230a according to the generated signals. Similarly, for the metal-material discharging section 1630 included in the welding rod unit 1800, signals for controlling a material discharge amount and the like from the discharge nozzle 1630a in the discharge driving section 1630b included in the metal-material discharging section 1630 are generated in the material supply controller 1500 on the basis of a control signal from the control unit 400. A predetermined amount of a metal material is discharged from the discharge nozzle 1630a according to the generated signal.

The head unit 1400 is explained more in detail.

Figure 3:
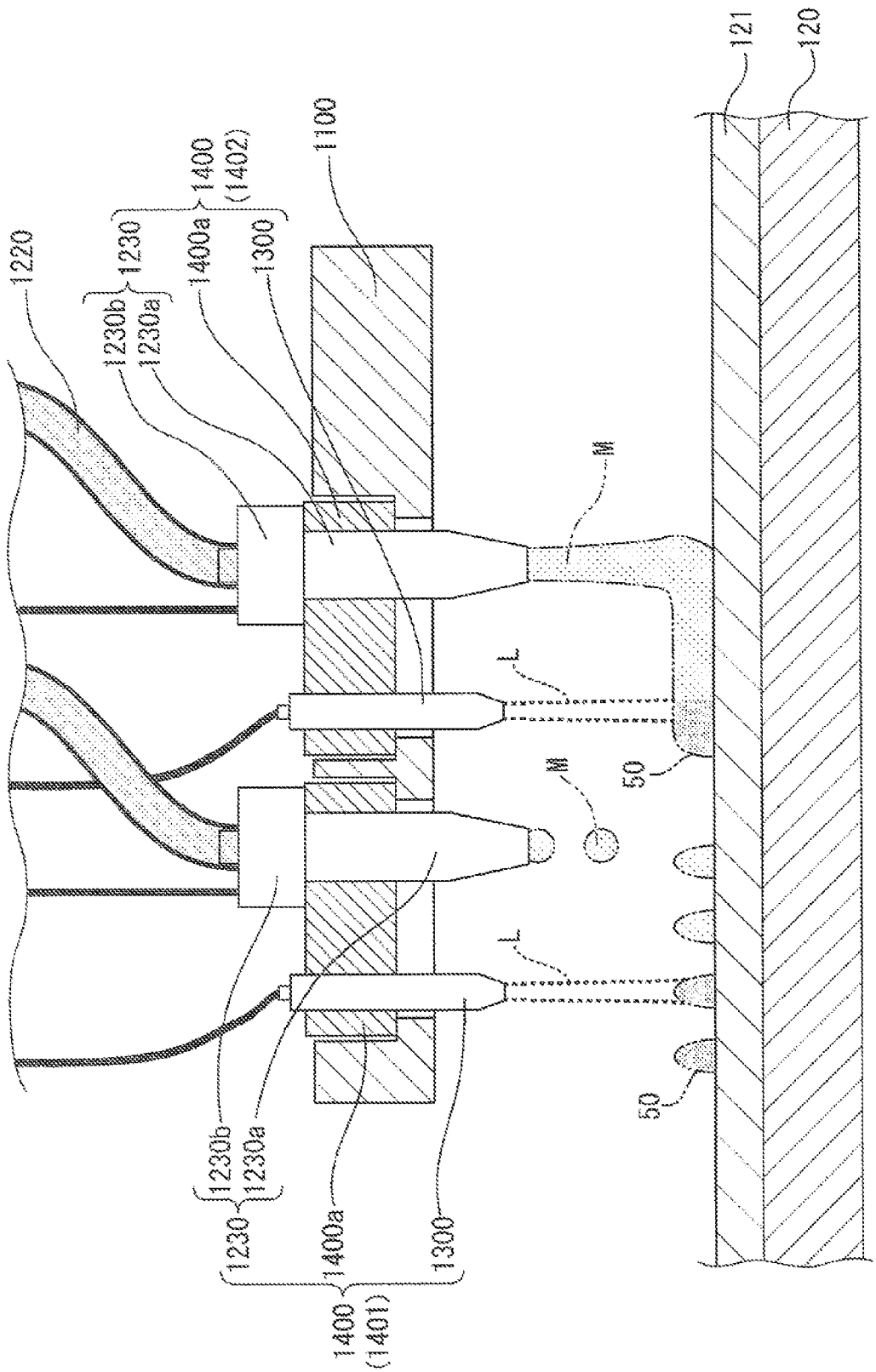
FIG. 3 is a schematic perspective view of a head base according to the embodiment of the invention.
Figure 4A:
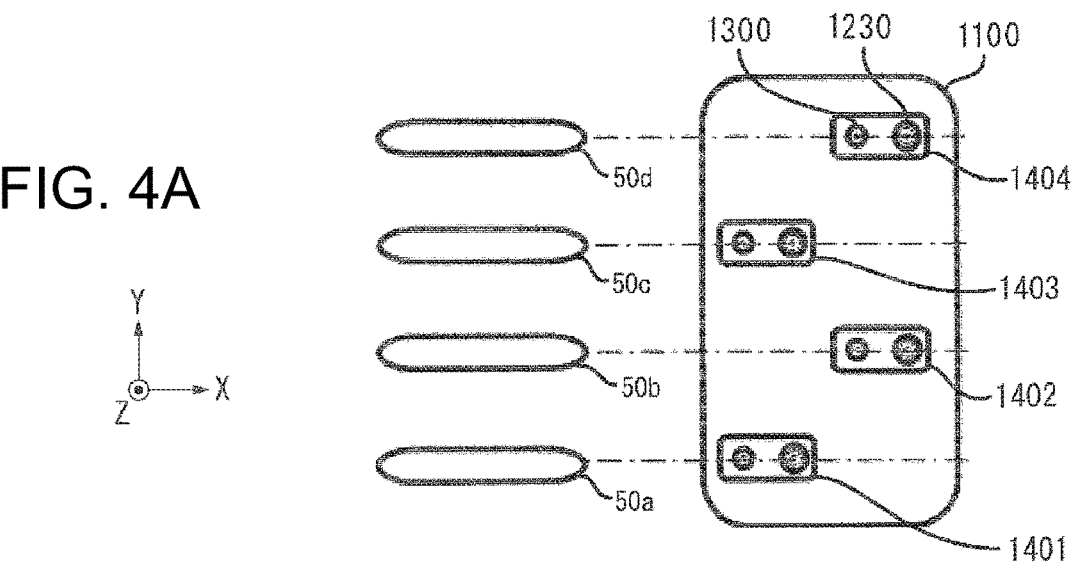
FIGS. 4A to 4C are plan views for conceptually explaining a relation between the disposition of head units and a formation form of a molten section according to the embodiment of the invention.
Figure 4B:
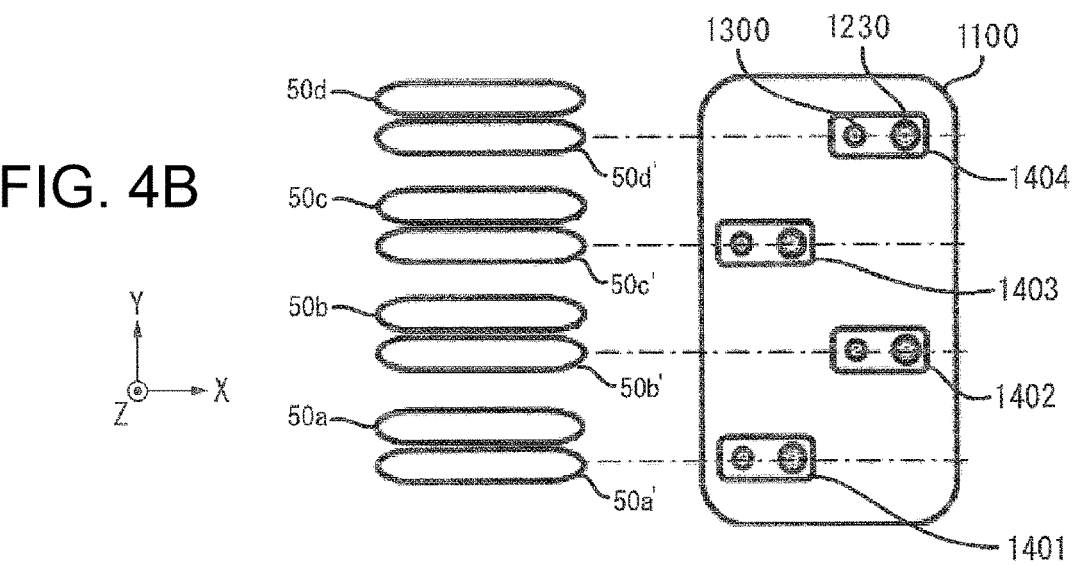
Figure 4C:
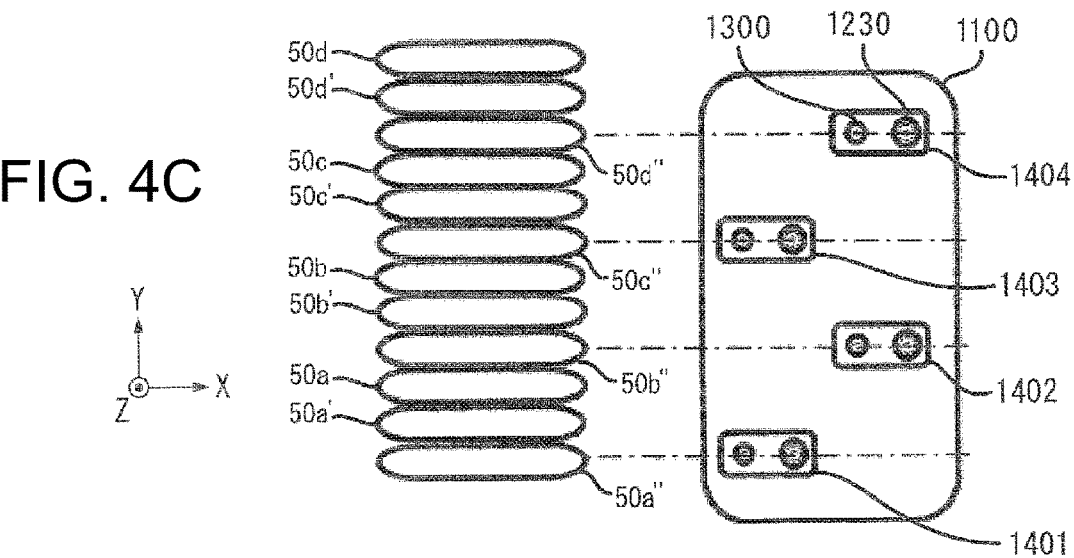

FIGS. 3 and 4A to 4C show an example of a holding form of the plurality of head units 1400 held in the head base 1100 and the laser radiating sections 1300 and the material discharging sections 1230 held by the head units 1400. FIGS. 4A to 4C are exterior views of the head base 1100 from an arrow D direction shown in FIG. 1B.

As shown in FIG. 3, the plurality of head units 1400 are held in the head base 1100 by not-shown fixing means. As shown in FIGS. 4A to 4C, the head base 1100 of the forming apparatus 2000 according to this embodiment includes the head units 1400 in which four units, that is, a head unit 1401 in a first row, a head unit 1402 in a second row, a head unit 1403 in a third row, and a head unit 1404 in a fourth row are disposed in a zigzag from the bottoms of the figures. As shown in FIG. 4A, the forming materials are discharged from the head units 1400 while moving the stage 120 in the X direction with respect to the head base 1100. Lasers L are radiated from the laser radiating sections 1300 to form molten sections 50 (molten sections 50a, 50b, 50c, and 50d). A formation procedure for the molten sections 50 is explained below.

Note that, although not shown in the figure, the forming-material discharging sections 1230 included in the respective head units 1401 to 1404 are connected to the forming-material supplying unit 1210 by the supply tubes 1220 via the discharge driving sections 1230b. The laser radiating sections 1300 are connected to the laser controller 430 and held by the holding jigs 1400a.

As shown in FIG. 3, a material M (in this embodiment, corresponding to the forming material) is discharged from the discharge nozzles 1230a of the forming-material discharging sections 1230 onto the sample plate 121 placed on the stage 120. In the head unit 1401, a discharge form in which the material M is discharged in a droplet state is illustrated. In the head unit 1402, a discharge form in which the material M is supplied in a continuous body state is illustrated. The discharge form of the material M may be either the droplet state or the continuous body state. However, in this embodiment, a form in which the material M is discharged in the droplet state is explained.

The material M discharged from the discharge nozzle 1230a in the droplet state flies substantially in the gravity direction and arrives on the sample plate 121. The laser radiating section 1300 is held by the holding jig 1400a. When the material M arriving on the sample plate 121 enters a laser radiation range according to the movement of the stage 120, the material M melts. Outside the laser radiation range, the material M solidifies and the molten sections 50 are formed. An aggregate of the molten sections 50 is formed as a partial formed object, for example, the partial formed object 501 (see FIG. 1A) of the three-dimensional formed object 500 formed on the sample plate 121. Note that the molten sections 50 and the partial formed object 501 can correspond to both of a contour region of the three-dimensional formed object and a contact region in contact with the contour region. That is, an object formed by discharging the forming material (the first forming material) from the forming-material discharging section 1230 corresponds to the contour region. An object formed by discharging the metal material (the second forming material) from the metal-material discharging section 1630 corresponds to the contact region.

A formation procedure for the molten sections 50 is explained with reference to FIGS. 4A to 5B.

Figure 5A:
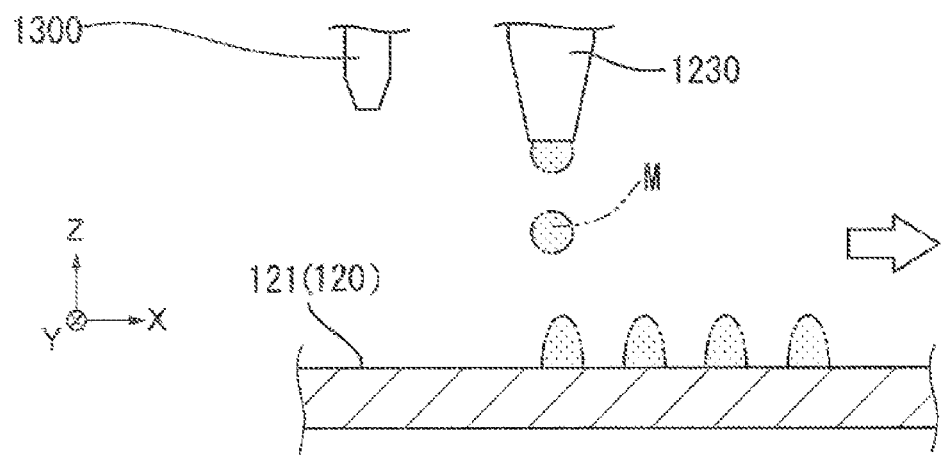
FIGS. 5A and 5B are schematic diagrams for conceptually explaining the formation form of the molten section.
Figure 5B:
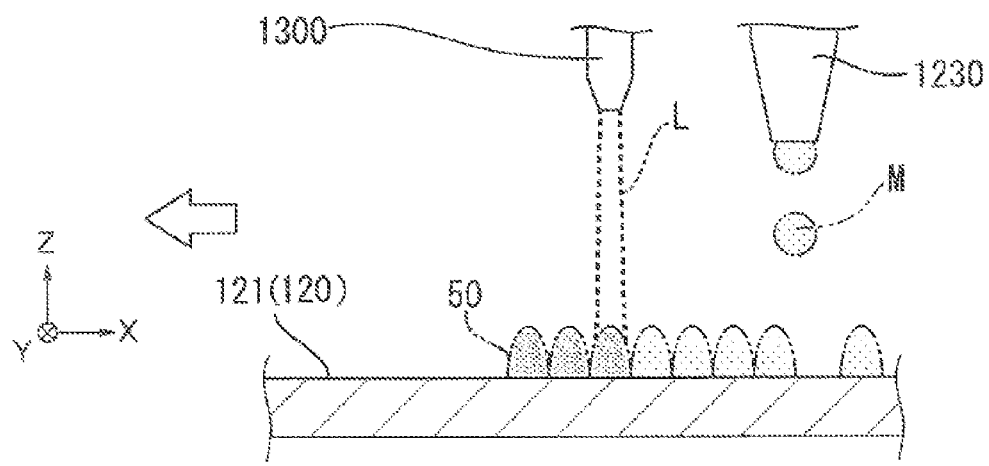

FIGS. 4A to 4C are plan views for conceptually explaining a relation between the disposition of the head units 1400 and a formation form of the molten sections 50 in this embodiment. FIGS. 5A and 5B are side views for conceptually showing the formation form of the molten sections 50.

First, when the stage 120 moves in a +X direction, the material M is discharged from the plurality of discharge nozzles 1230a in the droplet state. The material M is disposed in predetermined positions of the sample plate 121. When the stage 120 further moves in the +X direction, the material M enters the radiation range of the laser L radiated from the laser radiating sections 1300 and melts. When the stage 120 further moves in the +X direction, the material M exits the radiation range of the laser L and solidifies and the molten sections 50 are formed.

More specifically, first, as shown in FIG. 5A, the material M is disposed in the predetermined positions of the sample plate 121 at fixed intervals from the plurality of discharge nozzles 1230a while moving the stage 120 in the +X direction.

Subsequently, as shown in FIG. 5B, while moving the stage 120 in a −X direction shown in FIG. 1A, the material M is disposed anew to fill spaces among the predetermined positions where the material M is disposed at the fixed intervals. When the stage 120 is continuously moved in the −X direction, the material M enters the radiation range of the laser L and is melted (the molten sections 50 are formed).

Note that time from the disposition of the material M in the predetermined positions until the material M enters the radiation range of the laser L can be adjusted according to moving speed of the stage 120. For example, when a solvent is included in the material M, it is possible to facilitate drying of the solvent by reducing the moving speed of the stage 120 and increasing the time until the material M enters the radiation range.

A configuration may be adopted in which, while moving the stage 120 in the +X direction, the material M is disposed to overlap (not to be spaced apart) in the predetermined positions of the sample plate 121 from the plurality of discharge nozzles 1230a and enters the radiation range of the laser L while being kept moving in the same direction (the molten sections 50 are formed by only movement on one side in the X direction of the stage 120 rather than being formed by reciprocating movement in the X direction of the stage 120).

By forming the molten sections 50 as explained above, the molten sections 50 (the molten sections 50a, 50b, 50c, and 50d) for one line in the X direction (first line in a Y direction) of the head units 1401, 1402, 1403, and 1404 shown in FIG. 4A are formed.

Subsequently, in order to form the molten sections 50 (the molten sections 50a, 50b, 50c, and 50d) in a second line in the Y direction of the head units 1401, 1402, 1403, and 1404, the head base 1100 is moved in a −Y direction. As a moving amount, when a pitch between the nozzles is represented as P, the head base 1100 is moved in the −Y direction by P/n (n is a natural number) pitch. In this embodiment, n is assumed to be 3.

By performing operation same as the operation explained above shown in FIGS. 5A and 5B, molten sections 50' (molten sections 50a', 50b', 50c', and 50d') in the second line in the Y direction shown in FIG. 4B are formed.

Subsequently, in order to form the molten sections 50 (the molten sections 50a, 50b, 50c, and 50d) in a third line in the Y direction of the head units 1401, 1402, 1403, and 1404, the head base 1100 is moved in the −Y direction. As a moving amount, the head base 1100 is moved in the −Y direction by P/3 pitch.

By performing operation same as the operation explained above shown in FIGS. 5A and 5B, molten sections 50" (molten sections 50a", 50b", 50c", and 50d") in the third line in the Y direction shown in FIG. 4B are formed. The molten layer 310 can be obtained.

As the material M discharged from the material discharging sections 1230, from one or two or more units of the head units 1401, 1402, 1403, and 1404, a forming material different from a forming material discharged from the other head units can also be supplied. Therefore, by using the forming apparatus 2000 according to this embodiment, it is possible to obtain a three-dimensional formed object including a composite material portion formed object formed from different kinds of materials.

Note that, in this embodiment, a contour region of the three-dimensional formed object can be formed by the head units 1400. A contact region in contact with the contour region equivalent to the inside of the contour region can be formed by the welding rod unit 1800. The welding rod unit 1800 includes one metal-material discharging section 1630 and one welding rod 1810. The partial formed object 501 can be formed by one welding rod unit 1800 by arc-welding, with the welding rod 1810, the metal material discharged from the metal-material discharging section 1630 (welding the metal material with application of thermal energy involved in arc discharge).

Note that, in this embodiment, the second forming material is supplied by discharging the metal material serving as the second forming material from the metal-material discharging section 1630. However, the forming apparatus 2000 is not limited to such a configuration. The second forming material may be, for example, a paste state, a powder state, or a wire state (a filament state). As a method other than the discharge, the second forming material can be supplied by a method of, for example, jetting powder using an air current or pushing out a filament from a roller pair.

Figure 6A:
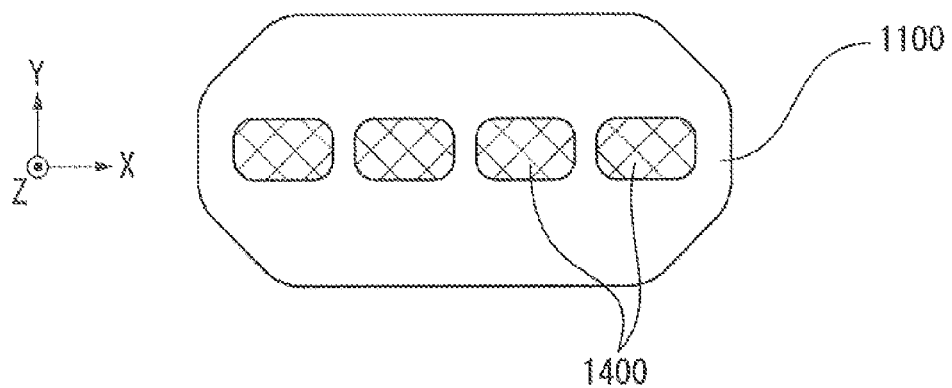
FIGS. 6A and 6B are schematic diagrams showing examples of other kinds of disposition of the head unit disposed in the head base.
Figure 6B:
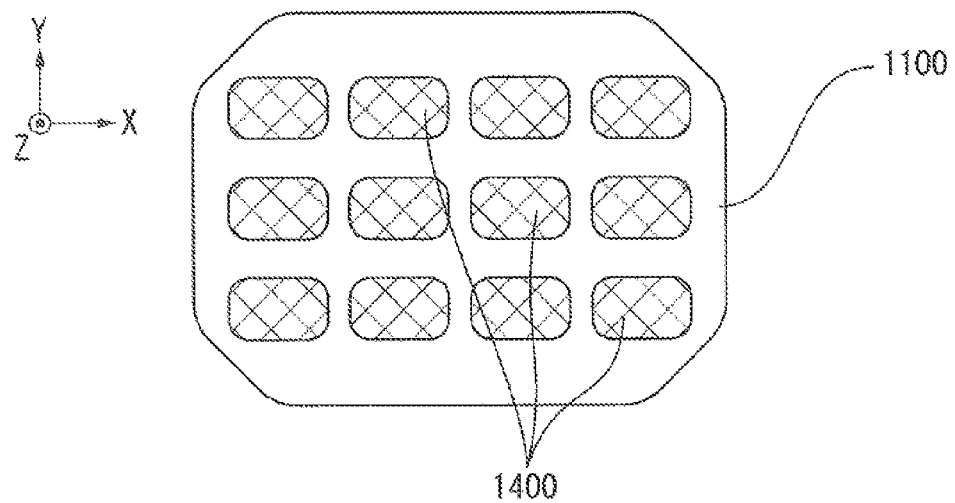

The number and the array of the head units 1400 and the welding rod unit 1800 included in the forming apparatus 2000 according to this embodiment are not limited to the number and the array explained above. In FIGS. 6A and 6B, as examples of the number and the disposition, examples of other kinds of disposition of the head units 1400 disposed on the head base 1100 are schematically shown.

FIG. 6A shows a form in which the plurality of head units 1400 are arrayed in parallel in the X-axis direction on the head base 1100. FIG. 6B shows a form in which the head units 1400 are arrayed in a lattice shape on the head base 1100. Note that, in both the figures, the number of arrayed head units is not limited to the examples shown in the figure.

An example of a manufacturing method for a three-dimensional formed object performed using the forming apparatus 2000 according to this embodiment is explained.

FIGS. 7A to 7G are schematic diagrams showing an example of a manufacturing process for a three-dimensional formed object performed using the forming apparatus 2000.

First, as shown in FIG. 7A, the material M (the forming material) to be formed as a first layer (a bottom layer) is supplied from the forming-material discharging sections 1230 to the sample plate 121 not shown in the figure. The molten section 50 is formed by radiating the lasers L on portions corresponding to a contour region of the three-dimensional formed object from the laser radiating sections 1300. Note that, when the material M is supplied to the sample plate 121 not shown in the figure, the material M is supplied to not only the portions corresponding to the contour region of the three-dimensional formed object but also to portions other than a portion corresponding to a contact region of the three-dimensional formed object. This is because, when an undercut section (a portion convex in the XY plane direction with respect to a lower layer) is present in an upper layer, the undercut section is supported in the lower layer. In the lower layer, the material M (the forming material) may be sintered by radiating the laser beams L from the laser radiating sections 1300.

Subsequently, as shown in FIG. 7B, the material M to be formed as a second layer is supplied from the forming-material discharging sections 1230 to be stacked on an upper side (a Z(+) direction) of the material M in the first layer. The molten sections 50 are formed by radiating the lasers L on portions corresponding to the contour region of the three-dimensional formed object from the laser radiating sections 1300. Note that, when the material M in the second layer is supplied onto the material M in the first layer, the material M is supplied to not only the portions corresponding to the contour region of the three-dimensional formed object but also to the portions other than the portion corresponding to the contact region (a region in contact with the contour region) of the three-dimensional formed object.

Subsequently, as shown in FIG. 7C, the metal material is supplied from the metal-material discharging section 1630 to a portion corresponding to the contact region (the region in contact with the contour region) of the three-dimensional formed object in the second layer. A molten section 55 is formed by causing the welding rod 1810 to arc-discharge and applying heat of the arc discharge to the portion to which the metal material is supplied. Note that the contour region may be sintered rather than being melted. According to the formation of the molten section 55, the contour region may be melted by heat of the formation.

The operations shown in FIGS. 7B and 7C are repeated while forming new layers.

Specifically, as shown in FIG. 7D, the material M to be formed as a third layer is supplied from the forming-material discharging sections 1230 to be stacked on the upper side of the material M in the first layer. The molten sections 50 are formed by radiating the lasers L from the laser radiating sections 1300 on the portions corresponding to the contour region of the three-dimensional formed object. Note that, when the material M in the third layer is supplied onto the material M in the second layer, the material M is supplied not only to the portions corresponding to the contour region of the three-dimensional formed object but also to portions other than the portion corresponding to the contact region of the three-dimensional formed object.

Subsequently, as shown in FIG. 7E, the metal material is supplied from the metal-material discharging section 1630 to a portion corresponding to the contact region of the three-dimensional formed object in the third layer. The molten section 55 is formed by causing the welding rod 1810 to arc-discharge and applying heat of the arc discharge to the portion to which the metal material is supplied.

By repeating the operations shown in FIGS. 7B and 7C (the operations shown in FIGS. 7D and 7E), as shown in FIG. 7F, a complete body O of the three-dimensional formed object is completed. Note that FIG. 7G shows a state in which the complete body O of the three-dimensional formed object is developed (deposits deriving from the material M are removed from the complete body O of the three-dimensional formed object).

Another example of the manufacturing method for the three-dimensional formed object performed using the forming apparatus 2000 according to the embodiment is explained.

FIGS. 8A to 8F are schematic diagrams showing another example of the manufacturing process for the three-dimensional formed object performed using the forming apparatus 2000.

FIGS. 8A and 8B are the same as FIGS. 7A and 7B. Therefore, detailed explanation of the figures is omitted.

In this example, after a state shown in FIG. 8B, as shown in FIG. 8C, the material M to be the third layer is supplied from the forming-material discharging sections 1230 to be stacked on the upper side of the material M in the first layer. The molten sections 50 are formed by radiating the lasers L on portions corresponding to the contour region of the three-dimensional formed object from the laser radiating sections 1300.

Subsequently, as shown in FIG. 8D, the metal material is supplied from the metal-material discharging section 1630 to corresponding regions of the three-dimensional formed object, that is, portions corresponding to the contact region of the three-dimensional formed object in the second layer and the third layer. The molten sections 55 are formed by causing the welding rod 1810 to arc-discharge and applying heat of the arc discharge to the portions to which the metal material is supplied.

In this way, in this example, the portions corresponding to the contact region of the three-dimensional formed object for two layers are melted by performing the arc discharge operation once.

By repeating the operations shown in FIGS. 8A to 8D, as shown in FIG. 8E, the complete body O of the three-dimensional formed object is completed. Note that FIG. 8F shows a state in which the complete body O of the three-dimensional formed body is developed.

Note that examples other than the examples of the manufacturing method for the three-dimensional formed object performed using the forming apparatus 2000 according to the embodiment include forms explained below.

For example, instead of the method of causing the welding rod 1810 to arc-discharge and applying heat of the arc discharge to the contact region, it is possible to adopt a method of radiating a laser on the contact region to heat the contact region and spraying metal powder to the radiated region as the second forming material. By adopting such a method, the three-dimensional formed object to be formed does not need to be conductive. Therefore, it is possible to use a nonconductive material such as a ceramics material and a resin material as the second forming material.

As another embodiment for forming the contour region, a dispenser (a material supplying section) and a laser radiating section can be disposed as separate units. It is also possible to dispose a laser radiating section, a plurality of mirrors for positioning a laser beam from the laser radiating section, a lens system for converging the laser beam, and the like above the stage 120, adopt a galvanometer scanner system for scanning the laser beam at high speed and in a wide range, and solidify the material.

As another example, for example, it is possible to adopt a method of forming the contour region using, instead of the forming-material discharging section 1230 that discharges the forming material as droplets, a needle dispenser that deposits the forming material at a needle tip and disposing the forming material in predetermined positions. By adopting such a method, it is possible to improve fineness of a contour shape.

An example of a manufacturing method for a three-dimensional formed object performed using the forming apparatus 2000 according to the embodiment is explained with reference to a flowchart.

Figure 9:
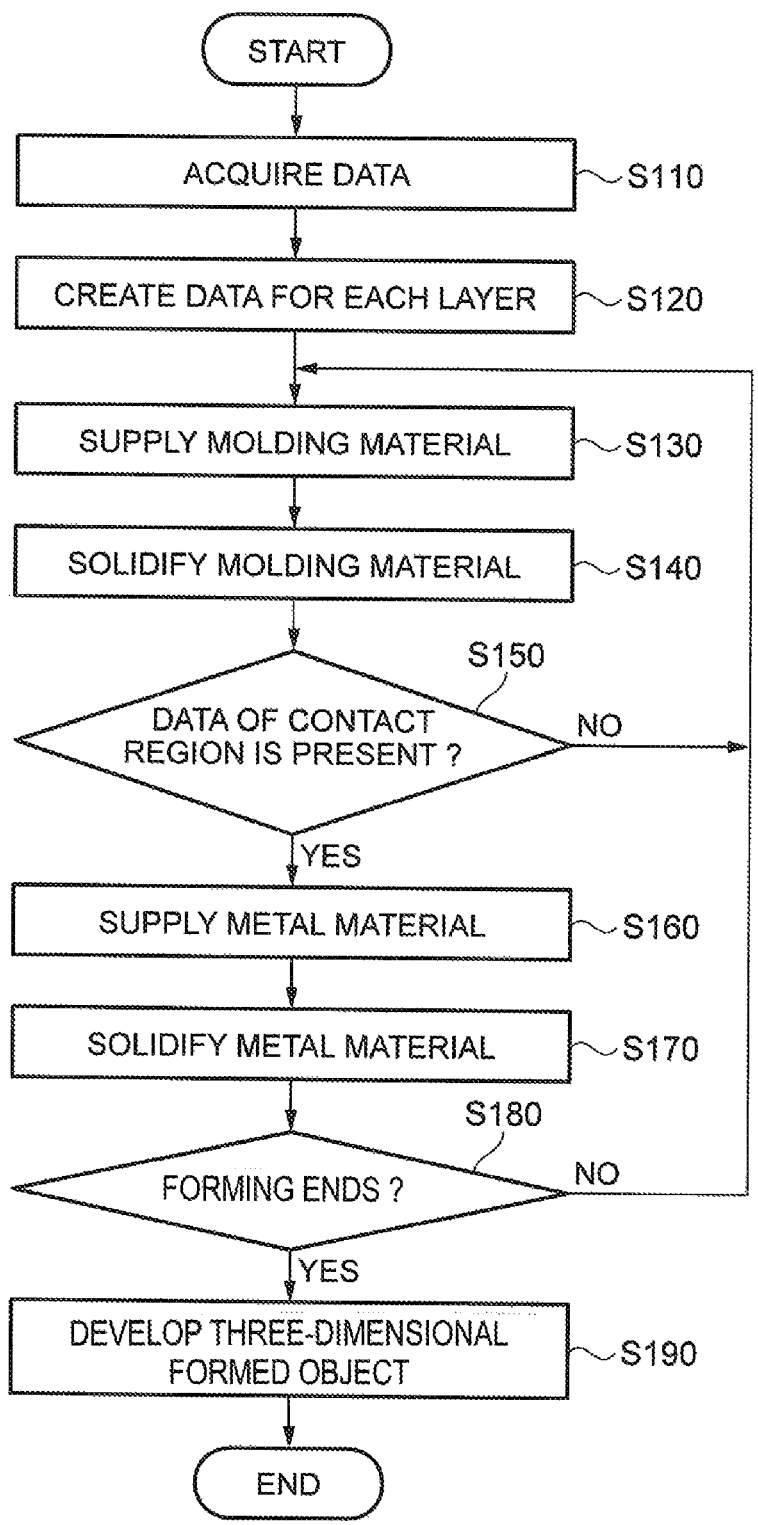
FIG. 9 is a flowchart of a manufacturing method for a three-dimensional formed object according to the embodiment of the invention.

FIG. 9 is a flowchart of a manufacturing method for a three-dimensional formed object in this embodiment.

As shown in FIG. 9, in the manufacturing method for the three-dimensional formed object in this embodiment, first, in step S110, data of the three-dimensional formed object is acquired. Specifically, data representing the shape of the three-dimensional formed object is acquired from, for example, an application program executed in a personal computer.

Subsequently, in step S120, data for each layer is created. Specifically, in the data representing the shape of the three-dimensional formed object, the three-dimensional formed object is sliced according to forming resolution in the Z direction to generate bitmap data (sectional data) for each cross section.

The bitmap data generated in this case is data distinguished by a contour region of the three-dimensional formed object and a contact region of the three-dimensional formed object.

Subsequently, in step S130, for example, the material M (the forming material) formed as a first layer is discharged from the forming-material discharging sections 1230 and supplied to the sample plate 121.

Subsequently, in step S140, the molten sections 50 are formed by radiating the lasers L on portions corresponding to the contour region of the three-dimensional formed object in the material M from the laser radiating sections 1300. In this embodiment, the solidification of the contour region is performed by the melting. However, the contour region may be solidified by another method such as sintering.

Subsequently, in step S150, it is determined whether data of the contact region is present in the layer formed in step S130. When data of the contact region is present, processing proceeds to step S160. When data of the contact region is absent, the processing returns to step S130.

Note that, when the metal material is solidified collectively for each plurality of layers, it may be also determined whether it is timing for solidifying the metal material.

Subsequently, in step S160, the metal material is discharged from the metal-material discharging section 1630 and supplied to the contact region in the layer formed in step S130.

Further, when this step is performed using the forming apparatus 2000, the metal material of a paste state is supplied. However, a form of the metal material supplied in this step is not limited to the paste state. The metal material may be supplied in a form such as a powder state, a wire state, or a granular state.

Subsequently, in step S170, the molten section 55 is formed by arc-discharging, with the welding rod 1810, the portion corresponding to the contact region of the three-dimensional formed object (melting the portion with application of thermal energy involved in the arc discharge). In this embodiment, the solidification of the contact region is performed by the melting by the application of the thermal energy involved in the arc discharge. However, the contact region may be solidified by another method.

Steps S130 to S180 are repeated until the forming of the three-dimensional formed object based on the bitmap data corresponding to the layers generated in step S120 ends in step S180.

Steps S130 to S180 are repeated. When the forming of the three-dimensional formed object ends, in step S190, development of the three-dimensional formed object is performed to end the manufacturing method for the three-dimensional formed object in this embodiment.

As explained above, the manufacturing method for the three-dimensional formed object in this embodiment is a manufacturing method for a three-dimensional formed object for manufacturing the three-dimensional formed object by stacking layers. The manufacturing method for the three-dimensional formed object includes a first-forming-material supplying step (corresponding to step S130) for supplying a first forming material (a forming material) of the three-dimensional formed object to a contour region of the three-dimensional formed object in the layers, a first-forming-material solidifying step (corresponding to step S140) for applying energy to the first forming material supplied to the contour region to solidify the first forming material, a second-forming-material supplying step (corresponding to step S160) for supplying a second forming material to a region corresponding to the three-dimensional formed object, the region being a contact region in contact with the contour region, and a second-forming-material solidifying step (corresponding to step S170) for applying energy to the second forming material supplied to the contact region to solidify the second forming material. A supply unit of the second forming material in the second-forming-material supplying step is larger than a supply unit of the first forming material in the first-forming-material supplying step.

Consequently, it is possible to highly accurately form the contour region where manufacturing accuracy of the three-dimensional formed object needs to be increased. It is possible to form, at high speed, the contact region where the manufacturing accuracy of the three-dimensional formed object does not need to be increased. Therefore, it is possible to achieve both of the manufacturing accuracy and the manufacturing speed of the three-dimensional formed object. Note that, for example, when the first forming material and the second forming material are collectively supplied using a green sheet, an application range of the energy in the second-forming-material solidifying step is wider than an application range of the energy in the first-forming-material solidifying step. Consequently, it is possible to highly accurately form the contour region where the manufacturing accuracy of the three-dimensional formed object needs to be increased. It is possible to form, at high speed, the contact region where the manufacturing accuracy of the three-dimensional formed object does not need to be increased. Therefore, it is possible to achieve both of the manufacturing accuracy and the manufacturing speed of the three-dimensional formed object.

The "first forming material" and the "second forming material" may be different or may be the same. When the "first forming material" and the "second forming material" are the same, a configuration in which the "first-forming-material supplying step" includes the "second-forming-material supply step" (the "the second-forming-material supplying step" is not performed separately from the "the first-forming-material supplying step" because the "first-forming-material supplying step" includes the "second-forming-material supply step") is also included in the invention.

Note that the "contour" is a portion that forms a shape of the surface of the three-dimensional formed object. For example, when a coat layer is provided on the surface of the three-dimensional formed object, the "contour" sometimes means a lower layer of the coat layer.

The "supply unit" means, for example, when the forming materials are intermittently supplied, the size of the individual forming material (when the forming materials are supplied in a state of droplets, the size of the droplets) and, when the forming materials are continuously supplied, supply width of the forming material. The "application range of the energy" means, for example, when the energy is radiated and applied, a radiation range of the energy.

Concerning the "solidify", a form for sintering particles and a form for solidifying the particles after melting the particles are also explained as solidifying the particles.

The "second forming material capable of achieving a purpose other than increasing the manufacturing accuracy" is not particularly limited. However, examples of the second forming material include a metal material (including an alloy and metal oxide). When the metal material is used as the second forming material, it is possible to increase the strength of the three-dimensional formed object. It is possible to configure a three-dimensional formed object having high strength.

Expressed in another way, the manufacturing apparatus 2000 for the three-dimensional formed object in this embodiment is a manufacturing apparatus for a three-dimensional formed object that manufactures the three-dimensional formed object by stacking layers. The manufacturing apparatus for the three-dimensional formed object includes a first-forming-material supplying section (the forming-material discharging section 1230) configured to supply a first forming material of the three-dimensional formed object to a contour region of the three-dimensional formed object in the layers, a first-forming-material solidifying section (the laser radiating section 1300) configured to apply energy to the first forming material supplied to the contour region to solidify the first forming material, a second-forming-material supplying section (the metal-material discharging section 1630) configured to supply a second forming material to a region corresponding to the three-dimensional formed object, the region being a contact region in contact with the contour region, and a second-forming-material solidifying section (the welding rod 1810) configured to apply energy to the second forming material supplied to the contact region to solidify the second forming material. A supply unit of the second forming material in the second-forming-material supplying section is larger than a supply unit of the first forming material in the first-forming-material supplying section.

Consequently, it is possible to highly accurately form the contour region where manufacturing accuracy of the three-dimensional formed object needs to be increased. It is possible to form, at high speed, the contact region where the manufacturing accuracy of the three-dimensional formed object does not need to be increased. Therefore, it is possible to achieve both of the manufacturing accuracy and the manufacturing speed of the three-dimensional formed object. Note that, for example, when the first forming material and the second forming material are collectively supplied using a green sheet, an application range of the energy in the second-forming-material solidifying section is wider than an application range of the energy in the first-forming-material solidifying section. Consequently, it is possible to highly accurately form the contour region where the manufacturing accuracy of the three-dimensional formed object needs to be increased. It is possible to form, at high speed, the contact region where the manufacturing accuracy of the three-dimensional formed object does not need to be increased. Therefore, it is possible to achieve both of the manufacturing accuracy and the manufacturing speed of the three-dimensional formed object.

As explained above, the manufacturing method for the three-dimensional formed object in this embodiment is a manufacturing method for a three-dimensional formed object for manufacturing the three-dimensional formed object by stacking layers. The manufacturing method for the three-dimensional formed object includes a first-forming-material supplying step (corresponding to sep S130) for supplying a first forming material of the three-dimensional formed object to a contour region of the three-dimensional formed object in the layers, a first-forming-material solidifying step (corresponding to step S140) for applying energy to the first forming material supplied to the contour region to solidify the first forming material, and a second-forming-material solidifying step (corresponding to steps S160 and S170) for supplying, while applying energy to a contact region in contact with the contour region, a second forming material to a region corresponding to the three-dimensional formed object to solidify the second forming material supplied to the contact region. A supply unit of the second forming material in the second-forming-material solidifying step is larger than a supply unit of the first forming material in the first-forming-material supplying step.

Consequently, it is possible to highly accurately form the contour region where manufacturing accuracy of the three-dimensional formed object needs to be increased. It is possible to form, at high speed, the contact region where the manufacturing accuracy of the three-dimensional formed object does not need to be increased. Therefore, it is possible to achieve both of the manufacturing accuracy and the manufacturing speed of the three-dimensional formed object. Note that an application range of the energy in the second-forming-material solidifying step is wider than an application range of the energy in the first-forming-material solidifying step. Consequently, it is possible to highly accurately form the contour region where manufacturing accuracy of the three-dimensional formed object needs to be increased. It is possible to form, at high speed, the contact region where the manufacturing accuracy of the three-dimensional formed object does not need to be increased. Therefore, it is possible to achieve both of the manufacturing accuracy and the manufacturing speed of the three-dimensional formed object.

Expressed in another way, the manufacturing apparatus 2000 for the three-dimensional formed object in this embodiment is a manufacturing apparatus for a three-dimensional formed object that manufactures the three-dimensional formed object by stacking layers. The manufacturing apparatus for the three-dimensional formed object includes a first-forming-material supplying section (the forming-material discharging section 1230) configured to supply a first forming material of the three-dimensional formed object to a contour region of the three-dimensional formed object in the layers, a first-forming-material solidifying section (the laser radiating section 1300) configured to apply energy to the first forming material supplied to the contour region to solidify the first forming material, and a second-forming-material solidifying section (the metal-material discharging section 1630 and the welding rod unit 1800) configured to supply, while applying energy to a contact region in contact with the contour region, a second forming material to a region corresponding to the three-dimensional formed object to solidify the second forming material supplied to the contact region. A supply unit of the second forming material in the second-forming-material solidifying section is larger than a supply unit of the first forming material in the first-forming-material supplying section.

Consequently, it is possible to highly accurately form the contour region where manufacturing accuracy of the three-dimensional formed object needs to be increased. It is possible to form, at high speed, the contact region where the manufacturing accuracy of the three-dimensional formed object does not need to be increased. Therefore, it is possible to achieve both of the manufacturing accuracy and the manufacturing speed of the three-dimensional formed object. Note that an application range of the second-forming-material solidifying section is wider than an application range of the energy in the first-forming-material solidifying section. Consequently, it is possible to highly accurately form the contour region where manufacturing accuracy of the three-dimensional formed object needs to be increased. It is possible to form, at high speed, the contact region where the manufacturing accuracy of the three-dimensional formed object does not need to be increased. Therefore, it is possible to achieve both of the manufacturing accuracy and the manufacturing speed of the three-dimensional formed object.

In the manufacturing method for the three-dimensional formed object in this embodiment, in the first-forming-material supplying section, the material M, which is the first forming material, is supplied to the contour region by the forming-material discharging section 1230, which is a noncontact jet dispenser. The noncontact jet dispenser is capable of discharging and disposing the first forming material at a short cycle. Therefore, it is possible to increase the manufacturing speed of the three-dimensional formed object. It is possible to discharge the first forming material and accurately dispose the first forming material in predetermined positions.

On the other hand, in the first-forming-material supplying step, it is possible adopt a method of supplying the first forming material to the contour region with a needle dispenser. The needle dispenser is capable of finely adjusting an amount of the first forming material and disposing the first forming material. Therefore, it is possible to increase the manufacturing accuracy of the three-dimensional formed object by using the needle dispenser.

In the manufacturing method for the three-dimensional formed object in this embodiment, the second-forming-material supplying step is performed after the first-forming-material supplying step. It is possible to increase the manufacturing accuracy of the three-dimensional formed object by performing the second-forming-material supplying step after the first-forming-material supplying step. Therefore, in the manufacturing method for the three-dimensional formed object, it is possible to increase the manufacturing accuracy of the three-dimensional formed object.

Note that, as shown in FIGS. 8A to 8F, the second-forming-material supplying step may be performed after the contour region is formed for a plurality of layers in the first-forming-material supplying step. By performing the second-forming-material supplying step, for which accuracy does not need to be increased in particular, collectively for the plurality of layers in this way, it is possible to increase the manufacturing speed of the three-dimensional formed object.

In the first-forming-material solidifying step of the manufacturing method for the three-dimensional formed object in this embodiment, a laser, which is an electromagnetic wave, is applied to the first forming material to solidify the first forming material. In this way, the first-forming-material solidifying step is easily and highly accurately performed.

In the second-forming-material solidifying step of the manufacturing method for the three-dimensional formed object in this embodiment, heat generated by arc discharge is applied to the second forming material to solidify the second forming material. In this way, thermal energy is applied to a wide range to increase the manufacturing speed of the three-dimensional formed object. It is possible to quickly perform the second-forming-material solidifying step.

In the second-forming-material solidifying step, the second forming material may be supplied to the contact region, on which the laser is radiated, and solidified. Consequently, it is possible to easily and highly accurately perform the second-forming-material solidifying step.

As the first forming material, it is possible to use a material including at least one of magnesium, iron, copper, cobalt, titanium, chrome, nickel, aluminum, maraging steel, stainless steel, cobalt chrome molybdenum, a titanium alloy, a nickel alloy, an aluminum alloy, a cobalt alloy, a cobalt chrome alloy, alumina, and silica. Therefore, it is possible to manufacture a three-dimensional formed object having particularly high rigidity.

In the supply of the second forming material in the manufacturing method for the three-dimensional formed object in this embodiment, the second forming material is supplied in the paste state. However, the second forming material may be supplied in at least one form of a powder state, a wire state, and a granular state. It is possible to easily supply the second forming material in the paste state or the powder state or quickly supply the second forming material in the wire state or the granular state.

The invention is not limited to the embodiment explained above and can be realized in various configurations without departing from the spirit of the invention. For example, the technical features in the embodiment corresponding to the technical features in the aspects described in the summary can be replaced or combined as appropriate in order to solve a part or all of the problems or achieve a part or all of the effects. Unless the technical features are explained in this specification as essential technical features, the technical features can be deleted as appropriate.

The entire disclosure of Japanese patent No. 2015-203468, filed Oct. 15, 2015 is expressly incorporated by reference herein.

What is claimed is:

1. A manufacturing method for a three-dimensional formed object, the manufacturing method for the three-dimensional formed object comprising:

depositing a first forming material to form a first layer, the first forming material being selectively deposited from a first discharge nozzle in a droplet state and from a second discharge nozzle in a continuous body state, each of the first discharge nozzle and the second discharge nozzle being mounted to a single first head base;

applying energy from a first energy source to a portion of the first forming material in the first layer to melt the portion of the first forming material to form a molten section of the portion of the first forming material that subsequently solidifies to form a contour region of the three-dimensional formed object, the contour region being a portion of a final profile of the three-dimensional formed object, the first energy source is mounted in the first head base and delivers laser energy to melt the portion of the first forming material of the first layer with a remainder of the first forming material being unirradiated by the first energy source;

supplying a second forming material to a region corresponding to the three-dimensional formed object, the region being a contact region in contact with the contour region in the first layer, the second forming material being delivered from a discharging section mounted in a second head base;

applying energy from a second energy source to the second forming material supplied to the contact region to solidify the second forming material, the second energy source being mounted in the second head base and delivers energy by arc discharge to the second forming material; and removing the remainder of the first forming material following stacking of a plurality of contour regions and a plurality of contact regions that form the three-dimensional formed object, wherein the first forming material supplied to the first layer is supplied to both the contour region of the three-dimensional formed object and to portions other than a portion corresponding to the contact region of the three-dimensional formed object.

2. The manufacturing method for the three-dimensional formed object according to claim 1, wherein the supplying of the second forming material is performed after the depositing the first forming material.

3. The manufacturing method for the three-dimensional formed object according to claim 2, wherein the supplying of the second forming material is performed after the contour region is formed for the first layer and a plurality of other layers.

4. The manufacturing method for the three-dimensional formed object according to claim 1, wherein the first forming material includes at least one of magnesium, iron, copper, cobalt, titanium, chromium, nickel, aluminum, maraging steel, stainless steel, cobalt chromium molybdenum alloy, a titanium alloy, a nickel alloy, an aluminum alloy, a cobalt alloy, a cobalt chromium alloy, alumina, and silica.

5. The manufacturing method for the three-dimensional formed object according to claim 1, wherein, in the supplying of the second forming material, the second forming material is supplied in at least one form of a paste state, a powder state, a wire state, and a granular state.

6. The manufacturing method of claim 1, wherein supplying the second forming material to the region occurs following solidification of the portion of the first forming material to form the contour region.

* * * * *